Inventor
THOMAS O. BRANDON
By D.C. Snyder
Attorney

Inventor
THOMAS O. BRANDON
By D. C. Snyder
Attorney

Inventor
THOMAS O. BRANDON

June 9, 1953 T. O. BRANDON 2,641,521
RECORDING MEANS OF MISSILE DISPENSING
TUBES OF ANGLE DETERMINING DEVICES
Filed April 13, 1948 4 Sheets-Sheet 4

Inventor
THOMAS O. BRANDON
By D. C. Snyder
Attorney

Patented June 9, 1953

2,641,521

UNITED STATES PATENT OFFICE 2,641,521

RECORDING MEANS OF MISSILE DISPENSING TUBES OF ANGLE DETERMINING DEVICES

Thomas O. Brandon, Cucamonga, Calif.

Application April 13, 1948, Serial No. 20,818

4 Claims. (Cl. 346—2)

(Granted under Title 35, U. S. Code (1952), sec. 266)

The present invention relates to a recording device for use with a missile dispensing tube and more particularly to a recording device applied to a missile dispensing tube as used in conjunction with an angle measuring device. The invention further relates to a missile dispensing tube and recording device, and to locking means for releasably securing the tube and recording means in the desired position on a support.

An object of the invention is to provide a new and improved recording device applied to a missile dispensing tube for the determination of angular measurements.

Another object of the invention is the provision of a recording device mounted on a missile dispensing tube of the class associated with angle measuring instruments, by which the point of contact of the missile is recorded, thus enabling the determination of angular measurements.

Another object of the invention is the provision of a recording device adapted for attachment to the missile dispensing tube of an angle measuring instrument, with which angular measurements can be determined and with which a large number of measurements can be taken consecutively on a single recording strip, the recording device embodying structural features of attachment to the tube and features of a winding structure for the recording material.

A further object is the provision of a missile dispensing tube having a recording unit at its lower end and having means affixed thereto for locking said tube and recording means in desired position on a support while a recording and determination of angular measurements is being made.

Another object is the provision of a recording device carried on a missile dispensing tube and having parts so disposed as to be accessible through apertures in the tube carrying support, as for example, a sextant frame.

Another object of the invention is to provide a recording device for use with a missile dispensing tube which is light, compact, readily positioned and removed, and requiring little manipulation in use, and which is of precision accuracy.

These and other objects and advantages of the invention will be more apparent from the following description and exemplifying drawings in which:

Fig. 6 is an enlarged detail of the positioning or locking means.

Figure 1:
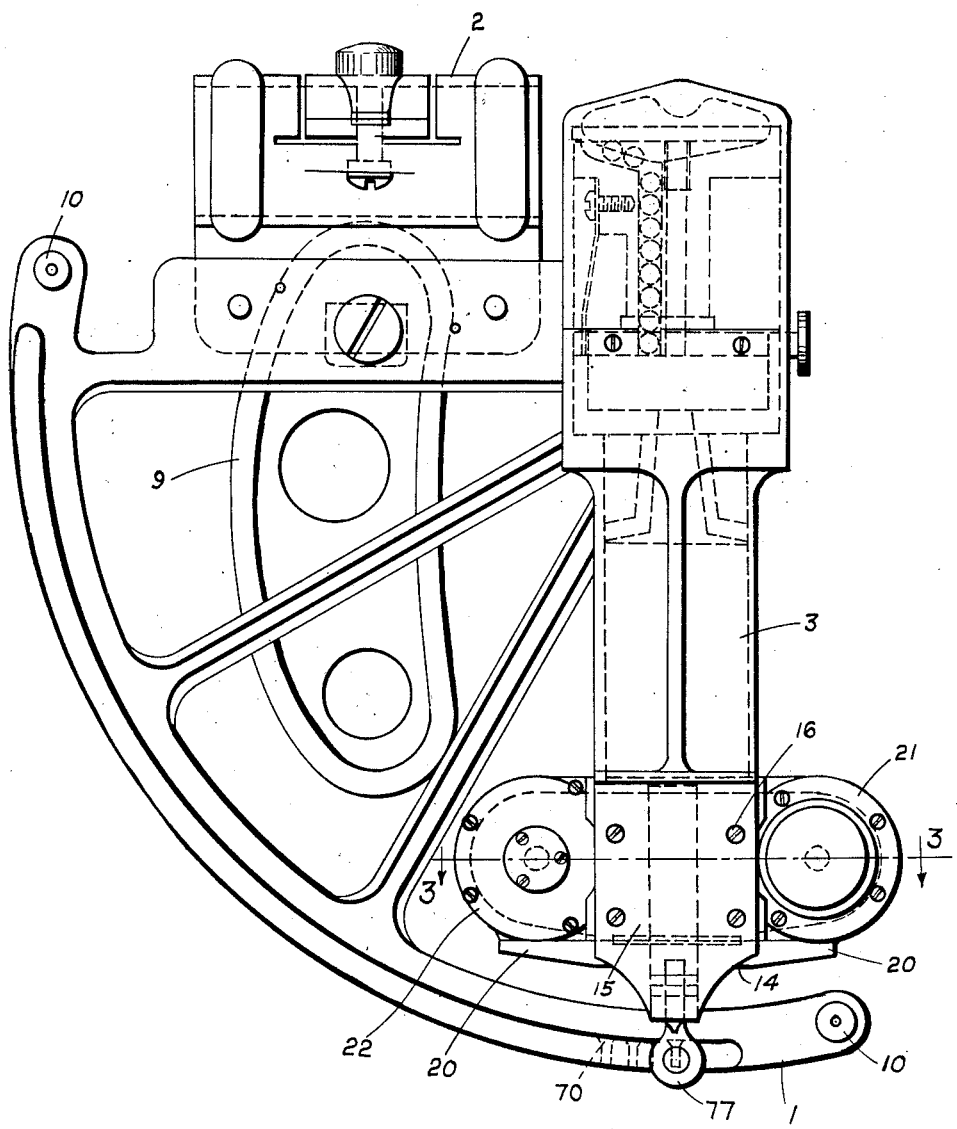
Fig. 1 is a view of a sextant embodying the invention, the index arm and sighting tube being omitted.
Figure 2:
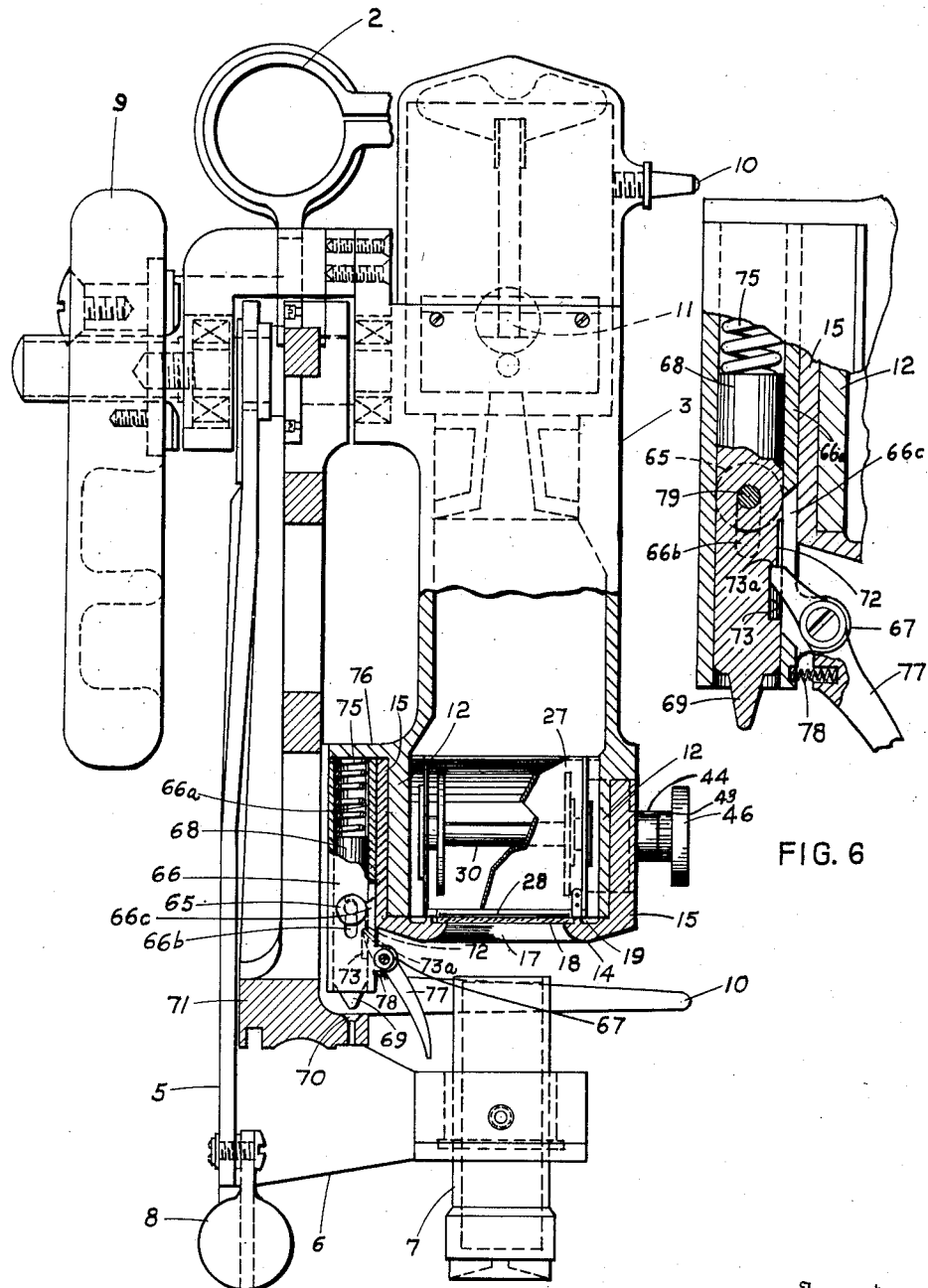
Fig. 2 is a view thereof, partly in section, taken in a direction at right angles to that of Fig. 1, and including an index arm. The sectional showing of the lower end of the missile dispensing tube is substantially on the line 2—2 of Fig. 3.
Figure 3:
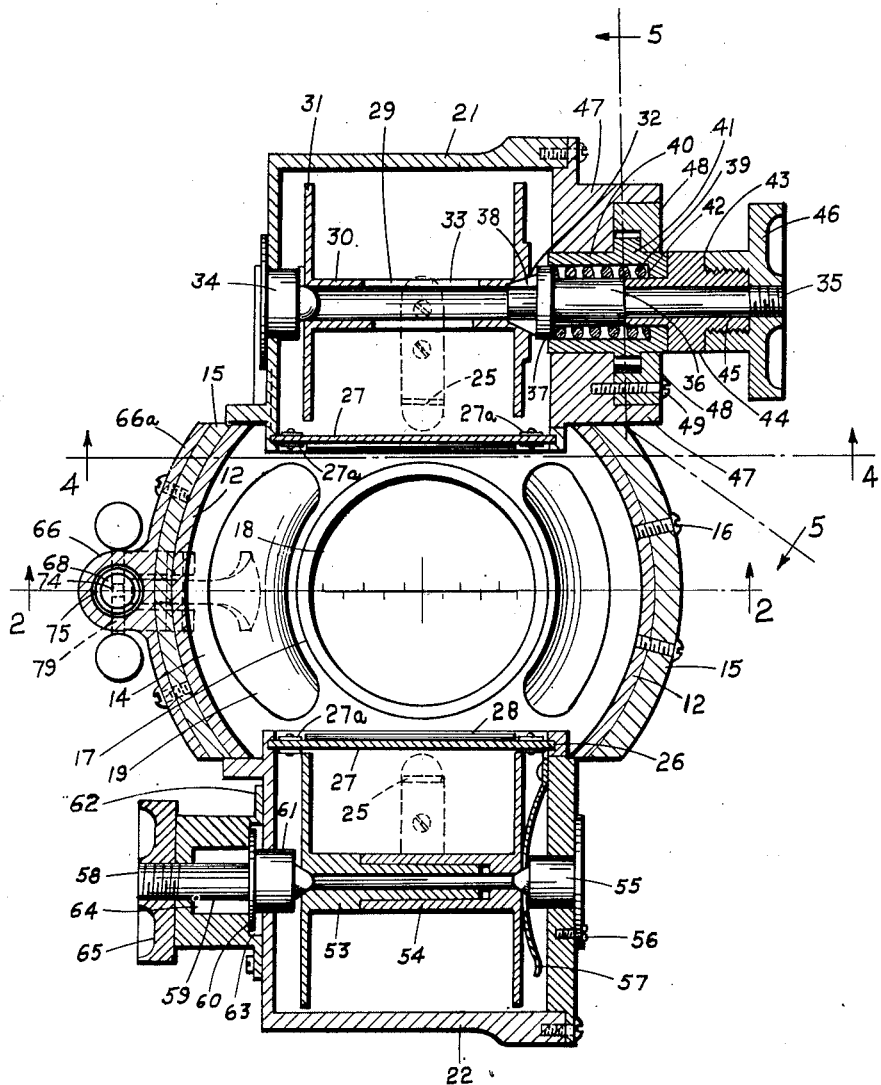
Fig. 3 is a sectional view substantially on line 3—3 of Fig. 1.
Figure 5:
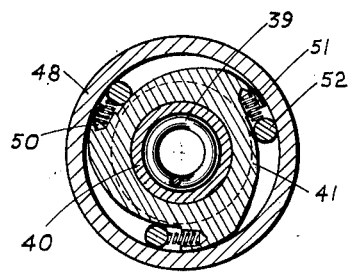
Fig. 5 is a view substantially on line 5—5 of Fig. 3, showing the winding clutch mechanism.
Figure 4:
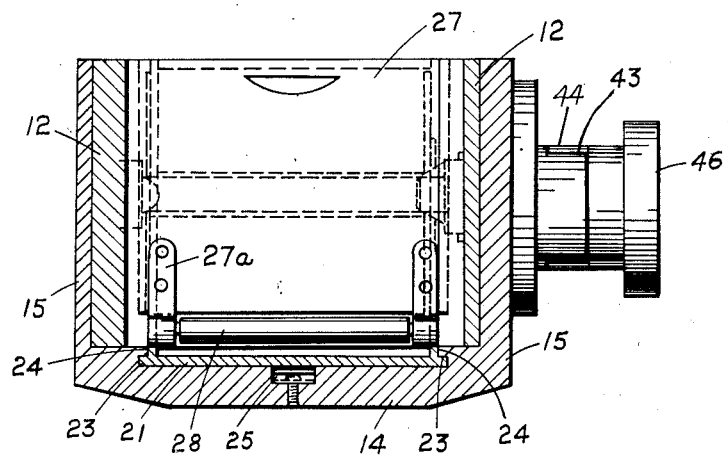
Fig. 4 is a sectional view substantially on the line 4—4 of Fig. 3.

The present invention comprises a recording device adapted to be attached to a missile dispensing tube for measuring angular displacement. One known use of a missile dispensing tube is in association with a sextant. The invention is not to be limited to any particular type of instrument, but for the purpose of setting forth a clear description, the recording device of the present invention will be described for use with a sextant or like angle measuring instrument.

Referring to the drawings, the sextant desirably comprises an openwork frame 1 embodying an arcuate segment. A sighting tube of a suitable form (not shown) is affixed to the frame by a bracket 2 or the like, at a suitable point, preferably near the top for taking an observation on a celestial body. A missile dispensing tube 3 is pivotally connected adjacent its upper end to the frame for free pendulous movement thereon. A locking means to be hereinafter described in detail, is mounted near the lower end of the tube for releasably affixing the tube against movement with respect to the frame. An index arm 5 is also pivotally mounted near the top of the frame and is disposed at the opposite side of the frame from the missile dispensing tube. The index arm carries a laterally extending member 6 adapted to extend to a point below the tube and mounting a reading glass 7 thereon, the arm being adapted for arcuate movement along the arcuate frame by means of a tangent worm screw or the like (not shown) and provided with worm disengaging means 8, such, for example, as is shown in my co-pending application filed December 10, 1946, Serial No. 715,233, now Patent No. 2,504,960, issued April 25, 1950, for Bearing Structure for Sextants or the Like. Other members are desirably carried on the frame such as the handle 9 and legs 10, and any desired indicia, as for example, degrees of arc.

The recording device of the present invention is adapted for attachment at the lower end of the missile dispensing tube 3. The tube has suitable missile dispensing mechanism housed in its upper end adapted to drop small spherical objects such as steel balls or the like, for making an impression on the recording material. The recording material preferably comprises thin paper having an overlying sheet of carbon paper. The tube of the present invention is formed at its lower end with oppositely disposed wall extensions 12. The recording device comprises a shell having a base portion 14 with oppositely disposed upstanding walls 15 adapted to receive the tube wall extensions 12 in face to face relationship and to be secured thereto as by screws 16 or the like. The base portion of the shell is cut away at its center to form a spherical opening 17 for receiving a lens 18 having a suitable scale inscribed thereon. The base of the recording shell is indented as at 19 to form a pocket for receiving the balls after they are dropped. The base portion between the upstanding wall portions 15 is formed with laterally extending portions 20 extending beyond the tube 3 at either side thereof. These lateral extensions 20 of the base portion of the shell are adapted to support spool housings comprising a winding spool housing 21 and a supply spool housing 22. The spool housings are of generally similar size and shape and have at either side along their lower edges a laterally extending flanged portion 23 adapted to be slidably received in a groove formed by the respective turned over or flanged portions 24 of the sides of the laterally extending portions 20 of the shell base. Spring detents 25 affixed to the upper face of the laterally extending base portions 20 of the shell are adapted to engage and hold the spool housings in position on the recording shell. The spool housings, as constructed, are open at their inner sides which communicate with the missile dispensing tube. A groove 26 is provided at the inner open side of each of the spool housings and is adapted to slidably receive a vertically disposed gate member 27. The gate members 27 are desirably made of a thin sheet of metal and, by means of roller support brackets 27a, carry a small elongated roller 28 at the lower end so disposed as to engage the recording material to guide and retain it in flat condition against the lens 18 in the shell base member.

The winding spool 29 comprises a tubular shank portion 30 having the conventional enlarged spool ends 31 thereon. One end of the spool may desirably be made thicker near the center portion and is provided with a beveled slot or keyway 32. The shank of the spool has a slot 33 therethrough for receiving the end of the recording strip material carried by the spools. The mechanism for retaining the spool in position in the housing 21 and for operating the spool 29 comprises a spool position post 34 affixed to one end of the spool housing and extending a short distance into the housing for engaging one end of the spool for rotation of the spool thereon. The spool winding or turning means is positioned in the other end of the housing and comprises an arbor or shaft 35 having an enlarged portion 36 at the inner end and threads on the opposite end. At the inner end of the enlarged portion 36, there is provided a circular flange portion or head 37 having affixed thereto a pair of oppositely disposed key members 38 adapted to be received in the slot 32 in the end of the spool. A coil spring 39 is mounted on the enlarged portion 36 of the arbor shaft 35 and seats at one end on the circular flange portion 37 of the arbor. A winding clutch 40 in the form of a sleeve having a plurality of cam portions 41 thereon, is adapted to slidably fit over the arbor. The clutch sleeve 40 is provided with a cylindrical bore through a portion thereof of a size to receive the arbor flange 37 for sliding movement therein, and a smaller bore through the remainder of the clutch to receive the arbor shaft 35 and knob extension 45. The spring 39 carried on the arbor shaft and engaging at one end against the flanged portion 37 of the shaft, engages at its other end against the shoulder 42 formed by the large and small bores in the clutch. The outer portion of the clutch member 40 has a slot 43 therethrough. The slot 43 is adapted to receive laterally extending key portions 44 of knob extension member 45 which is adapted to receive the arbor shaft 35. At the outer threaded end of the arbor shaft a hand wheel or knob 46 is affixed, being adapted to receive in threaded engagement both the arbor shaft 35 and the outer threaded portion of the knob extension 45, thus affixing together the knob, knob extension, the clutch member 40 keyed to the knob extension, and the arbor shaft 35 for rotation as a unit. The arbor receiving end member of the spool housing is in the form of a circular plate or disc 47 of considerable thickness and which is recessed in its outer face to receive the clutch and arbor unit heretofore described. A clutch bearing 48 is positioned in this recessed portion of the housing end member, being affixed therein by suitable means such as by screws 49 or the like, and surrounds the cam members 41 carried on the clutch member 40. The enlarged cam portions 41 of the clutch member have pockets 50 therein adapted to receive small coil springs 51. A freemoving bearing roller 52 is disposed at the end of each of the springs, the rollers being held by the springs and acting to jam between the cams 41 and the inner surface of the clutch bearing 48 in case rotation of the clutch member is attempted in one direction, and thus to positively prevent rotation of the spool in that direction, while rolling freely to allow rotation of the clutch member and spool in the other or winding direction. Through the medium of this winding mechanism and clutch, the winding spool is adapted for rotation in one direction only, being positively prevented from any movement in the opposite direction.

The supply spool housing 22 is similar in size and form to the winding spool housing 21. The supply spool 53 is desirably made up of the conventional end members and a portion of a tubular shaft attached to each end member. The shaft portions 54 are adapted to be secured together to form a unit adapted to carry the recording material thereon. A spool position post 55 is mounted on one end of the spool housing by suitable means such as screws 56 and extends inwardly of the housing. The position post has a spool receiving tip thereon for engaging the end of the spool for rotation of the spool thereon. A spool tension spring 57 in the form of a flat piece of spring metal is affixed to the inner surface of the end wall of the spool housing adjacent the position post and has a hole therethrough to receive the spool engaging tip of the position post. The other end wall of the supply spool housing has an aperture therethrough for receiving a supply spool position arbor 58. This arbor comprises a shaft portion 59 having laterally extending flange portions 60 extending from opposite sides thereof, and an enlarged shaft portion 61 having a spool receiving tip thereon for engaging the end of the spool. An arbor housing is provided, having an outer circular rim 62 adapted to be suitably secured to the outer face of the spool housing end wall. The arbor housing has a recessed portion 63 at the inner end thereof of a size to receive the flange portions 60 of the arbor for rotation therein. Inward of the arbor housing member and extending from the recessed portion 63 is a slotted deeply recessed portion 64 adapted to receive the flanged portions 60 of the arbor for longitudinal movement therein. The head or outer face of the arbor housing is provided with a hole therethrough to receive the shaft portion 59 of the arbor. The outer end of the arbor shaft is threaded for receiving a knob 65 thereon. The arbor knob provides means for removing or disengaging the supply spool from the spool holding members by rotating the knob until the flanged portions of the arbor are aligned with the slotted portion 63 of the arbor housing, and then pulling the knob outwardly from the arbor housing, thus disengaging the spool engaging tip of the arbor from the spool. The spring member 57 overlying the position post 55 provides a frictional tension to the spool for preventing undue freedom of rotation of the spool.

The present invention also embodies a positioning or locking means 66 carried on the missile dispensing tube and adapted to engage the frame of the sextant for affixing the tube, and the heretofore described recording device carried on the tube, against movement relative to said frame. The locking means comprises a lock housing 66 having a plate portion 66a formed to fit the rounded contour of the wall 15 of the recording shell and is adapted to be secured thereto by means of screws or the like. The lock housing 66 is in the form of a vertically disposed tubular member having projecting flanges or ears 67 near the lower end thereof, and a slot 66c formed in the tubular body between the ears 67. The position lock is in the form of cylindrical bolt or plunger 68 having its lower end formed to provide a tip 69 to be received in detent recesses 70 carried in the upper surface of a lower flanged portion 71 of the sextant frame. On one side of the bolt are provided two adjoining recessed portions 72 and 73, the lower recess 73 being of greater depth and providing a shoulder 73a for receiving the latch means for maintaining the bolt in up or unlocked position. The upper recess 72 provides a flat bearing surface for the latch means. A transverse hole 74 is provided in the bolt, near the center thereof. The bolt 68 is so sized as to slidably fit into the tubular lock housing 66 with the recessed portions 72 and 73 facing toward the missile dispensing tube and the hole 74 in the bolt being in corresponding alignment with slots 66b aligned transversely of the tubular portion of the lock housing. A coil compression spring 75 is placed in the top portion of the tubular bolt carrying member or lock housing, the lower end of the spring resting on the top of the bolt and the top of the spring bearing against the overlying flange portion 76 of the missile dispensing tube. The latch means for maintaining the bolt in raised position and for releasing the bolt for locking the device comprises a release lever or finger 77 pivotally mounted between the inwardly projecting flanges or ears 67 of the lock housing. The finger 77 passes through the lock housing through the opening or slot 66c therein and engages the shoulder 73a formed on the face of bolt by the deeper recess 73 thus holding the bolt in up position. For keeping the inner end of the finger in pressing contact with the bolt, a small coil spring 78 is provided, being adapted to be received between the outer portion of the release finger and a suitable indenture at the lower end of the lock housing. By applying pressure to the outer portion of the release finger 77 the finger will be disengaged from the bolt and the bolt will move downwardly under the force of the overlying spring 75, into locking engagement with the sextant frame. For returning the bolt to upper position, pin means 79 are provided, desirably comprising a pin or pins positioned in and extending from each of the aligned slots 66b in the tubular portion of the lock housing and also threaded into the hole 74 in the bolt. The pin or pins 79, each may desirably be provided with a small finger piece in the form of a knob or the like. The bolt is lifted by the finger pin until the latch or release finger 77 engages under the shoulder 73a to retain the bolt in raised position.

In operating the device as used with a sextant, a sight is taken on the desired object by means of the sighting tube, the missile dispensing tube being in unlocked condition with the bolt raised and held by the latch or release lever, the tube then being free to find its own true vertical. When swinging motion of the missile dropping tube has ceased, the release finger of the position locking mechanism is pressed, thus releasing the locking bolt to engage the detent in the flange of the sextant frame. Then a missile is suitably released in the missile dropping tube to land and make an impression on the recording material which traverses the lower end of the tube from the supply spool to the winding spool. After a drop or series of drops have been recorded and readings taken, the winding spool knob may be rotated a desired amount to bring clean recording material into position beneath the tube. When the entire strip of recording material has been used, the spool housings are readily removed along with the spools and a full supply spool and empty winding spool are substituted for future operation.

It will be understood that various changes and modifications may be made in the structure and details of the device illustrated and described, without departing from the spirit of the invention or from the scope of the appended claims.

The invention described herein may be made or used by or for the Government of the United States for governmental purposes without the payment to me of any royalties thereon or therefor.

What is claimed is:

1. In combination, a missile dispensing tube adapted to be disposed in approximately vertical position, recording means at the lower end of said tube, said tube having oppositely disposed laterally facing openings, said recording means comprising spool housings mounted at said openings, spools in said housings disposed to provide recording strip material carried by said spools and passing across the lower end of said tube, a vertically sliding gate inserted in each of said spool housings, said gates covering the oppositely disposed laterally facing openings in said missile dispensing tube, and rollers mounted on the lower edges of said gates to contact said recording strip and to hold said strip in smooth condition below said tube.

2. In combination, a missile dispensing tube adapted to be disposed in approximately vertical position, recording means at the lower end of said tube, said tube having oppositely disposed laterally facing openings, said recording means comprising spool housings mounted at said openings, spools in said housings disposed to provide recording strip material carried by said spools and passing across the lower end of said tube, a spool rotating means, said means comprising a shaft mounted in one of said spool housings, oppositely disposed key members disposed at one end of said shaft for engaging said spool, a flanged portion on said shaft adjacent said key members, a hand knob affixed to the other end of said shaft, a knob extension affixed to said knob and also mounted on said shaft, said knob extension having oppositely disposed key portions extending laterally therefrom, a winding clutch, said clutch comprising a sleeve member having mounted thereon a plurality of cam extensions, said clutch sleeve being adapted to receive the shaft and the flanged portion on said shaft, and providing a shoulder, a spring interposed between said shoulder on said clutch sleeve and said flanged shaft portion for maintaining inward pressure on said shaft, keyways in said clutch sleeve for receiving said key portions of the knob extension thus adapting the clutch sleeve for rotation with said shaft, a clutch bearing having an aperture therein of such size as to slidably receive the cam portions affixed to said clutch sleeve, springs affixed to each cam member at the large end thereof, rollers disposed between said cam members and said clutch bearing, said rollers being held in position on said cam members by said springs, thus providing for freedom of movement of the clutch in one direction but positively preventing movement in the other direction, and a clutch housing member adapted to receive said clutch and clutch bearing and being affixed to said spool housing.

3. In combination in a missile dispensing tube for a sextant or the like angle determining instrument having means for fixing the tube relative to the frame of the instrument, said tube having oppositely disposed wall extensions at its lower end providing oppositely disposed openings therebetween, said opposite openings facing in a direction parallel to the plane of the frame and parallel to the plane of swing of the missile dispensing tube, a shell comprising a base portion having oppositely disposed upstanding walls engaging said wall extensions of said tube in face to face relation, said base portion of said shell extending laterally beyond said tube at either side thereof, spool housings removably mounted on said lateral base extensions, spools in said housings disposed to provide recording strip material carried by said spools to pass across the lower end of said tube, said spools comprising a supply spool and a winding spool having their axes normal to the plane of the frame, a hand wheel for said winding spool disposed for access outwardly of the frame, and a hand knob for the supply spool extending toward the frame and accessible through an opening in the frame, and means providing interlocking engagement between said spool housing and said lateral base extensions rendering said spool housings removable therefrom.

4. Apparatus according to claim 3 in which said lateral base extensions have inwardly extending overhanging portions providing recesses and said spool housings have outwardly disposed flange portions slidably received in said recesses and providing said interlocking engagement therebetween for slidable attachment and removal of said spool housings.

THOMAS O. BRANDON.

References Cited in the file of this patent
UNITED STATES PATENTS

| Number | Name | Date |
|---|---|---|
| 690,009 | Berger | Dec. 31, 1901 |
| 967,510 | Glosser | Aug. 16, 1910 |
| 1,258,387 | Bausch | Mar. 15, 1918 |
| 1,665,272 | Myers | Apr. 10, 1928 |
| 1,682,098 | Sonnek | Aug. 28, 1928 |
| 1,759,482 | Gendron | May 20, 1930 |
| 2,142,880 | Anderson et al. | Jan. 3, 1939 |
| 2,257,233 | Gallasch | Sept. 30, 1941 |
| 2,289,827 | Crumvine | July 14, 1942 |
| 2,402,395 | Hagner | June 18, 1946 |
| 2,403,919 | Hagner | July 16, 1946 |
| 2,411,425 | Hagner | Nov. 19, 1946 |
| 2,412,639 | Traugott | Dec. 17, 1946 |